(12) United States Patent
Mitsuoka et al.

(10) Patent No.: US 7,367,050 B2
(45) Date of Patent: Apr. 29, 2008

(54) STORAGE DEVICE

(75) Inventors: Yoshio Mitsuoka, Odawara (JP);
Hiroshi Kuwabara, Ninomiya (JP);
Shuichi Yagi, Matsuda (JP)

(73) Assignee: Hitachi, Ltd., Tokyo (JP)

( * ) Notice: Subject to any disclaimer, the term of this patent is extended or adjusted under 35 U.S.C. 154(b) by 242 days.

(21) Appl. No.: 10/859,986

(22) Filed: Jun. 4, 2004

(65) Prior Publication Data
US 2005/0216767 A1 Sep. 29, 2005

(30) Foreign Application Priority Data
Mar. 29, 2004 (JP) .............................. 2004-094133

(51) Int. Cl.
*H04L 9/32* (2006.01)
(52) U.S. Cl. .......................................... 726/2; 713/193
(58) Field of Classification Search .................... 713/1, 713/2, 188, 194, 193; 380/200, 201, 255, 380/277; 726/2; 711/163, 203
See application file for complete search history.

(56) References Cited

U.S. PATENT DOCUMENTS

| | | | |
|---|---|---|---|
| 6,421,714 B1* | 7/2002 | Rai et al. ..................... | 709/217 |
| 6,512,754 B2* | 1/2003 | Feder et al. ................. | 370/338 |
| 6,807,581 B1* | 10/2004 | Starr et al. ................... | 709/250 |
| 6,895,461 B1 | 5/2005 | Thompson | |
| 2003/0014600 A1 | 1/2003 | Ito et al. | |
| 2003/0055972 A1* | 3/2003 | Fuller et al. ................. | 709/226 |
| 2003/0154412 A1* | 8/2003 | Hetzler et al. .............. | 713/202 |
| 2004/0078521 A1 | 4/2004 | Hawks et al. | |
| 2004/0088513 A1* | 5/2004 | Biessener et al. ........... | 711/173 |
| 2004/0205089 A1* | 10/2004 | Alon et al. .................. | 707/200 |
| 2004/0250036 A1* | 12/2004 | Willman et al. ............ | 711/163 |
| 2005/0044244 A1* | 2/2005 | Warwick et al. ............ | 709/229 |
| 2005/0055572 A1* | 3/2005 | Warwick et al. ............ | 713/201 |
| 2005/0091504 A1 | 4/2005 | Shirogane | |
| 2005/0114574 A1 | 5/2005 | Okamoto et al. | |

FOREIGN PATENT DOCUMENTS

JP 2003-30053 7/2001

* cited by examiner

*Primary Examiner*—Kim Vu
*Assistant Examiner*—Joseph Pan
(74) *Attorney, Agent, or Firm*—Reed Smith LLP; Stanley P. Fisher, Esq.; Juan Carlos A. Marquez, Esq.

(57) ABSTRACT

The present invention relates to a storage device for supporting an iSCSI protocol as an interface with host devices, wherein, in realizing an authentication function of access control following the iSCSI protocol, presence and absence of an authentication of the host device connected under the same port can coexist. In the storage device that can be connected to a plurality of host devices, access information from the host devices is received through the iSCSI port, and the host devices are identified based on the access information and refers to an authentication control table memorized in a shared memory and associating an iSCSI name for specifying the host device in the unit of iSCSI port, with authentication information of the host device (necessity of authentication, user ID/password), to determine the necessity of the authentication to the iSCSI port from the host device. If the authentication is necessary from a result of the determination, the authentication is carried out and accessibility to a memory device is controlled based on the result of the authentication.

16 Claims, 13 Drawing Sheets

FIG. 6

| Item No. | RAID setting | | | HOST notification parameter | | | Execution action | Remarks |
|---|---|---|---|---|---|---|---|---|
| | Network Security ON/OFF | Presence/Absence of registration of Initiator | CHAP/None | Startup stage | Presence/Absence Of Auth Method | Presence/Absence Of CHAP | | |
| 1 | ON | Presence | CHAP | Security | Presence | Presence | CHAP authentication execution | |
| 2 | ON | Presence | CHAP | Security | Presence | Absence | Authentication failure response | |
| 3 | ON | Presence | CHAP | Security | Absence | - | Authentication failure response | |
| 4 | ON | Presence | CHAP | Operational | - | - | Authentication failure response | |
| 5 | ON | Presence | None | Security | Presence | Presence | Authentication failure response | |
| 6 | ON | Presence | None | Security | Presence | Absence | Ordinary authentication execution | |
| 7 | ON | Presence | None | Security | Absence | - | Ordinary authentication execution | |
| 8 | ON | Presence | None | Operational | - | - | Ordinary authentication execution | |
| 9 | ON | Absence | - | Security | Presence | Presence | Authentication failure response | |
| 10 | ON | Absence | - | Security | Presence | Absence | Authentication failure response | |
| 11 | ON | Absence | - | Security | Absence | - | Authentication failure response | |
| 12 | ON | Absence | - | Operational | - | - | Authentication failure response | |
| 13 | OFF | - | - | Security | Presence | Presence | Ordinary authentication execution | |
| 14 | OFF | - | - | Security | Presence | Absence | Ordinary authentication execution | |
| 15 | OFF | - | - | Security | Absence | - | Ordinary authentication execution | |
| 16 | OFF | - | - | Operational | - | - | Ordinary authentication execution | |

FIG. 8

| Step | Item | Processing content |
|---|---|---|
| 21 | Padding of message | Set data length to be 64-bits length smaller than multiple bit lengths of 512 |
| 22 | Add message-length Bit to message | Express data bit length in 64 bits and add it to be multiple bit lengths of 512 |
| 23 | Set encrypted initial value | Set four initial values(A,B,C,D) using little endian |
| 24 | Encryption | Encrypt every 16 words and obtain four values(A,B,C,D) |
| 25 | Encryption result output | Obtain message digest from encrypted four values |

FIG. 11

☐ Add New User Information

| iSCSI Name | Abcdefg.hijelmn.qrst ▽ | Help wording1 |
| Protocol | CHAP ▽ | Help wording2 |
| User | Numada I Yoshiharu | |
| Secret | ****************** | Help wording3 |
| Re-enter Secret | ****************** | |

☑ Enable this setting

[ OK ]   [ Cancel ]

81

STORAGE DEVICE

CROSS-REFERENCE TO RELATED APPLICATION

The present application claims priority from Japanese patent application No. JP 2004-94133 filed on Mar. 29, 2004, the content of which is hereby incorporated by reference into this application.

BACKGROUND OF THE INVENTION

The present invention relates to a storage device, and specifically to a technique effectively applied to a storage device supporting an iSCSI protocol as an interface with a host device, wherein an authentication function of access control is realized based on the iSCSI protocol in the storage device.

According to examinations by the present inventors, a conventional storage device includes the following technique for achieving the authentication function.

For example, as a realizable technique of the authentication function in the conventional storage device, there is such a technique as to: use a fiber channel as an interface with the host device; provide a control table for specifying, based on a user's utilizing method, an N port name inherent in each port, which is a WWN (World Wide Name) for uniquely identifying the host device, and a logical unit in the storage device, which permits an access from the host device, in an environment using a SCSI (Small Computer System Interface) protocol operating on the fiber channel; and control whether or not an access to the logical unit in the storage device is possible in accordance with the control table when a user executes an access from the host device (see Patent Document 1: Japanese patent Laid-open No. 2003-30053).

SUMMARY OF THE INVENTION

Therefore, as a result of the examinations by the present inventors, the following has been made evident about the technique for achieving the authentication function in the above-described conventional storage device.

For example, as described above, the realizable technique of the authentication function in the conventional storage device is applied to the environment using the SCSI protocol that operates on the fiber channel used as an interface with the host device, and is not applied to an environment adopting an iSCSI (Internet SCSI) protocol as an interface with the host device and further is not a technique for using an iSCSI name (described later) as identification information uniquely identifying the host device. Thus, in the storage device supporting a recent iSCSI protocol, it is desired that the authentication function for this iSCSI protocol is realized.

That is, it has been well known that, for example, in an IP-SAN (Internet Protocol-Storage Area Network), communication based on a communication protocol called an iSCSI is possible. In this communication technique based on the iSCSI, how an illegal access is blocked to improve security has become an important problem.

However, the access control technique based on the fiber channel, as described in Patent Document 1, cannot be applied to a technique for controlling an access based on the iSCSI protocol. This is because the access that the storage device receives through the fiber channel is necessarily an access from a host device connected to the same communication network, and is not an access from an unspecific node connected to another communication network unlike the access based on the iSCSI protocol. More specifically, under the iSCSI protocol, for example, a storage device connected to a certain LAN (Local Area Network) can receive an access from an unspecific information processing terminal through another LAN and the Internet connected thereto in some cases.

Thus, in the communication based on the iSCSI protocol, how the access control should be made for providing high security is an important problem and, further, whether or not presence and absence of authentications in the host devices connected under the same port can coexist is another important problem.

Accordingly, an object of the present invention is to provide a storage device for supporting the iSCSI protocol as an interface with a host device and, more particularly, to provide a technique capable of co-existence of presence and absence of the authentications in the host devices connected under the same port in order to realized the authentication function of the access control following the iSCSI protocol.

The above and other objects and features of the present invention will become apparent from the description of this specification and the accompanying drawings.

Outlines of representative ones of inventions disclosed in the present application will be briefly described as follows.

The present invention is applied to the storage device capable of being connected to a plurality of host devices and comprising: a memory device for memorizing write data received from the host device and/or read data transmitted to the host device; and a memory control section for controlling an access of the host device to the memory device, and applied to a controlling method for the same storage device and further has the following features.

That is, in the storage device of the present invention, the memory control section includes a plurality of iSCSI ports receiving accesses from the host devices, and a shared memory for memorizing authentication information of each host device connected to the iSCSI ports in the unit of each port of the plurality of iSCSI ports. Under such a configuration, the memory control section has a function of: receiving access information from the host device through the iSCSI port; identifying the host device based on the access information; referring to authentication information memorized in the shared memory to determine the necessity of an authentication with respect to the iSCSI port from the host device; executing the authentication if the authentication is necessary from the result of the determination; and controlling accessibility to the memory device based on the result of authentication. Particularly, the authentication is applied to a CHAP authentication.

More specifically, in the storage device of the present invention, the shared memory has an authentication control table associating an iSCSI name for specifying the host device, in the unit of each port of a plurality of iSCSI ports, with authentication information including use or unuse of the host device and a user ID/password. The memory control section refers to the authentication control table and determines use or unuse of the authentication with respect to the iSCSI port from the host device. Further, the shared memory has a logical unit control table defining a logical unit accessible by the host device, and the memory control section refers to the logical unit control table based on the result of the authentication and permits the host device to access the logical unit.

Also, in the storage device of the present invention, the authentication control table includes grouping information dividing the host devices connected to the iSCSI ports of the memory control section per group, and the memory control section refers to the authentication control table including the grouping information and determines use or unuse of an authentication with respect to the iSCSI port from the host device per group.

Further, the storage device of the present invention further comprises a control terminal for registering control information, and the control terminal registers, in the unit of each port of the plurality of iSCSI ports in the memory control section, authentication information of each host device connected to the iSCSI ports in the shared memory.

More specifically, in the storage device of the present invention, the control terminal associates an iSCSI name for specifying the host device, in the unit of each port of the plurality of iSCSI ports, with authentication information including use or unuse of the host device and a user ID/password, and registers the iSCSI name and the authentication information in the authentication control table of the shared memory. Further, the control terminal defines a logical unit accessible by the host device and registers the logical unit in the logical unit control table of the shared memory.

Further, in the storage device of the present invention, the control terminal can display information registered on the authentication control table and the logical unit control table. Additionally, the control terminal can add/change/delete information to the authentication control table and the logical unit control table.

A controlling method for a storage device according to the present invention, comprises the steps of: referring to an authentication control table, which associates an iSCSI name for specifying a host device, in the unit of each iSCSI port, with authentication information (necessity of authentication, user ID/password) of the host device registered preliminarily; determining necessity of an authentication; executing the authentication as occasion arises; referring to a logical unit control table which defines a logical unit accessible by the host device based on the result of the authentication as occasion demands; and thereby controlling accessibility to the logical unit.

Effects obtained from representative ones of inventions disclosed in the present application will be briefly described as follows.

According to the present invention, in the storage device supporting the iSCSI protocol as an interface with the host device, an authentication function of access control following this iSCSI protocol is realized. At this time, the host device is identified based on the iSCSI name and authentication information of each host device can be set in the unit of each port. Consequently, presence and absence of the authentications in the host devices connected under the same port can coexist. Additionally, this authentication function can be realized simultaneously and independently of a security function in an access of the logical unit to the host device.

BRIEF DESCRIPTION OF THE DRAWINGS

FIG. 6 is a diagram showing security authentication determining conditions in a storage device according to an embodiment of the present invention.

FIG. 8 is a diagram showing a processing procedure of an MD5 algorithm in a storage device according to an embodiment of the present invention.

FIG. 11 is a diagram showing a registration screen of user authentication information in a storage device according to an embodiment of the present invention.

DESCRIPTION OF THE PREFERRED EMBODIMENTS

Hereinafter, an embodiment of the present invention will be detailed based on the drawings. Note that members having the same function are denoted by the same reference symbol throughout all the drawings for explaining the embodiment and the repetitive description thereof will be omitted.

<Entire Configuration of System Including Storage Device>

Figure 1:
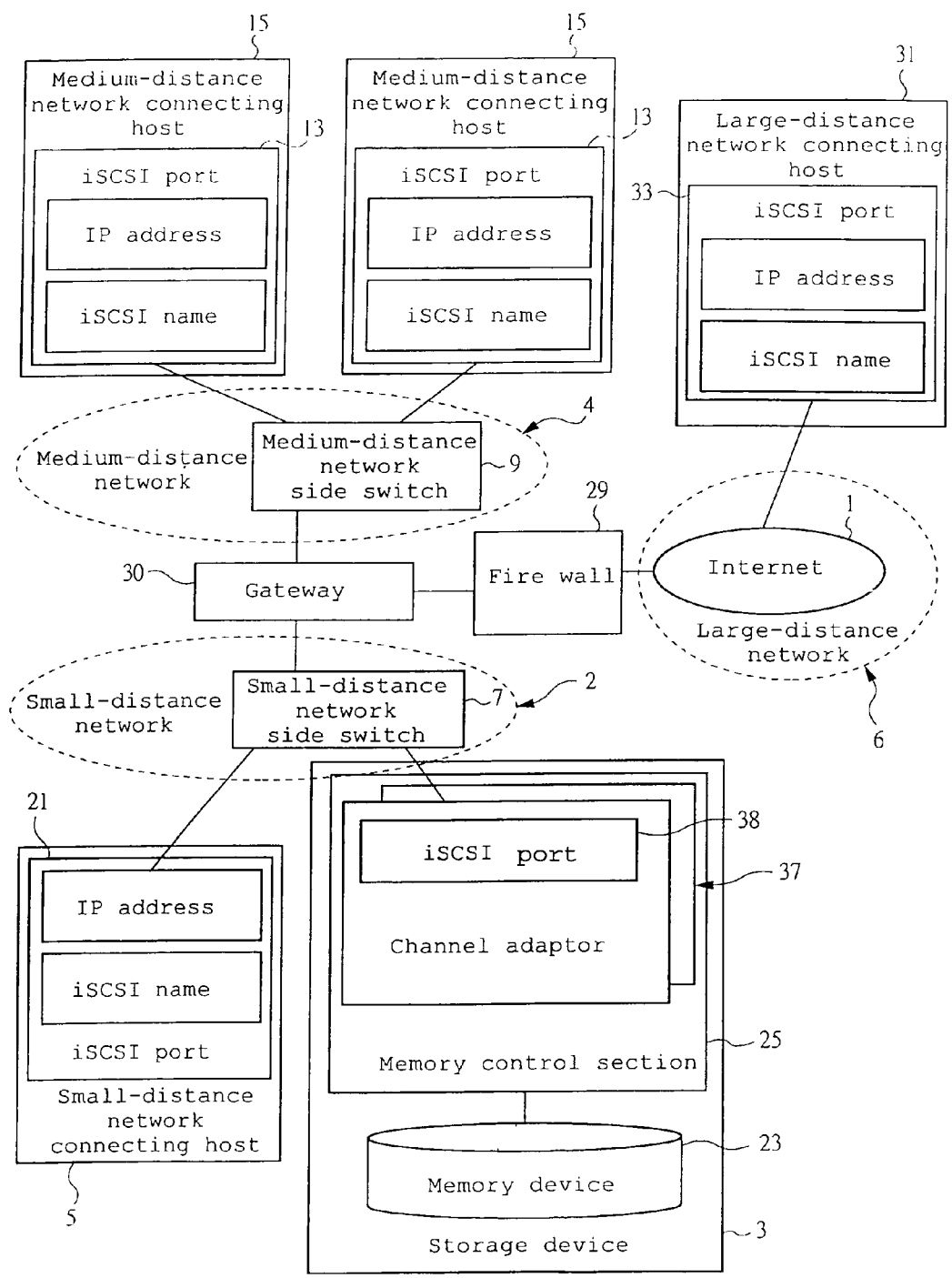
FIG. 1 is a diagram showing the entire configuration of a system including a storage device according to an embodiment of the present invention.

The entire configuration of a system including a storage device according to an embodiment of the present invention will be described with reference to FIG. 1 by way of an example. FIG. 1 is a configuration diagram showing the entire structure of the system including the storage device according to this embodiment.

In the system including the storage device according to this embodiment, a plurality of communication networks are connected to one another to build a single network group. The plurality of communication networks include: a communication network 2 having a storage device 3; and a communication network 4 or 6 relatively spaced a predetermined logical distance away from the communication network 2 (hereinafter abbreviated as "network relative logical distance"). More specifically, for example, the plurality of communication networks include: a "small-distance network" 2 whose relative network logical distance is zero or of small level; a "medium-distance network" 4 whose relative network logical distance is of medium level; and a "large-distance network" 6 whose relative network logical distance is of large level.

Herein, the description "relative network logical distance is zero or of small levels, for example, means: the communication network 2 itself in which the storage device 3 exists; or a repeater in which a type of a physical or logical interposition device interposed between the communication network 2 and a network to be connected thereto is the same as that of a small-distance network side switch 7 described later (or means that the number of interposition devices is small (e.g., one)).

Further, the description "relative network logical distance is of medium level" means, for example, that there exists the above-mentioned device of a predetermined type (e.g., gateway) between the small-distance network 2 and a network to be connected thereto (or that the number of interposition repeaters is of medium level).

Further, the description "relative network logical distance is of large level" means, for example, that instead of or in addition to the interposition device of the predetermined type (e.g., gateway) between the small-distance network 2 and the network to be connected thereto, the interposition device of another predetermined type (e.g., fire wall) exists (or that the number of interposition repeaters is large).

The small-distance network 2 is built up by connecting one or more node devices to a piece of network building equipment such as the small-distance network side switch 7 (e.g., hub). To the small-distance network side switch 7 is connected, for example, one or more host devices (hereinafter abbreviated as "small-distance network connecting host") 5 and the storage device 3 receiving an access from the host device 5 or a host device 15 or 31 as described later.

The small-distance network connecting host 5 is a computer machine such as a personal computer or PDA (personal digital assistants). The small-distance network connecting host 5 is provided with an iSCSI port 21 for establishing communication based on the iSCSI protocol. By the connecting of this iSCSI port 21 to the small-distance network switch 7, the small-distance network connecting host 5 is allowed to establish the communication based on the iSCSI protocol. The iSCSI port 21 is provided with a memory medium (hereinafter abbreviated as "port memory") such as a memory, and IP addresses allocated to the small-distance network connecting host 5 and an inherent iSCSI name is stored in the port memory.

The storage device 3 comprises: a memory device 23 including a plurality of physical disc groups (e.g., hard disc groups); and a memory control section 25 for controlling an access from the host device 5, 15 or 31 to the memory device 23. The memory control section 25 includes a plurality of sets of channel adapters 37 for controlling communication with the host device 5, 15 or 31. On each channel adapter included in the sets of channel adapters 37, an iSCSI port 38 is mounted. If this iSCSI port 38 is connected to the small-distance network side switch 7, the storage device 3 is allowed to establish the communication based on the iSCSI protocol.

The medium-distance network 4 is built up by connecting one or more node devices to a piece of network building equipment such as a medium-distance network side switch 9 (e.g., hub). To the medium-distance network side switch 9 is connected one or more host devices (hereinafter, abbreviated as "medium-distance network connecting host") 15.

The medium-distance network connecting host 15 is a computer machine such as a personal computer or PDA similarly to the small-distance network connecting host 5.

The medium-distance network connecting host 15 is also provided with the iSCSI port 13. By connecting this iSCSI port 13 to the medium-distance network side switch 9, the host device 15 is allowed to establish the communication based on the iSCSI protocol. The iSCSI port 13 includes a port memory, and an IP address allocated to the medium-distance network connecting host 15 and the inherent iSCSI name is stored in the port memory.

The large-distance network 6 is built up by communicably connecting one or more pieces of node equipment to the internet 1. The one or more pieces of node equipment is, for example, a host device (hereinafter abbreviated as "large-distance network connecting host") 31.

The large-distance network connecting host 31 is a computer machine such as a personal computer or PDA similarly to the small-distance network connecting host 5. The large-distance network connecting host 31 is also provided with the iSCSI port 33. By connecting the iSCSI port 33 to the Internet, this host device 31 is allowed to exert the communication based on the iSCSI protocol. The iSCSI port 33 includes a port memory, and an IP address allocated to the large-distance network connecting host 33 and an inherent iSCSI name is stored in the port memory.

As described above, the small-distance network side switch 7 of the small-distance network 2 and the medium-distance network side switch 9 of the medium-distance network 4 are connected to each other through a gateway 30 (e.g., a specified protocol converter in which commands based on the iSCSI protocol and commands based on the FC protocol are converted into one another). Further, the gateway 30 is connected to the Internet 1 through the fire wall 29. Consequently, the small-distance network 2 is connected to both the medium-distance network 4 and the large-distance network 6. Under this environment, the storage device 3 is allowed to execute the communication with the host device 5, 15 or 31.

<Hardware Configuration of Storage Device>

Figure 2:
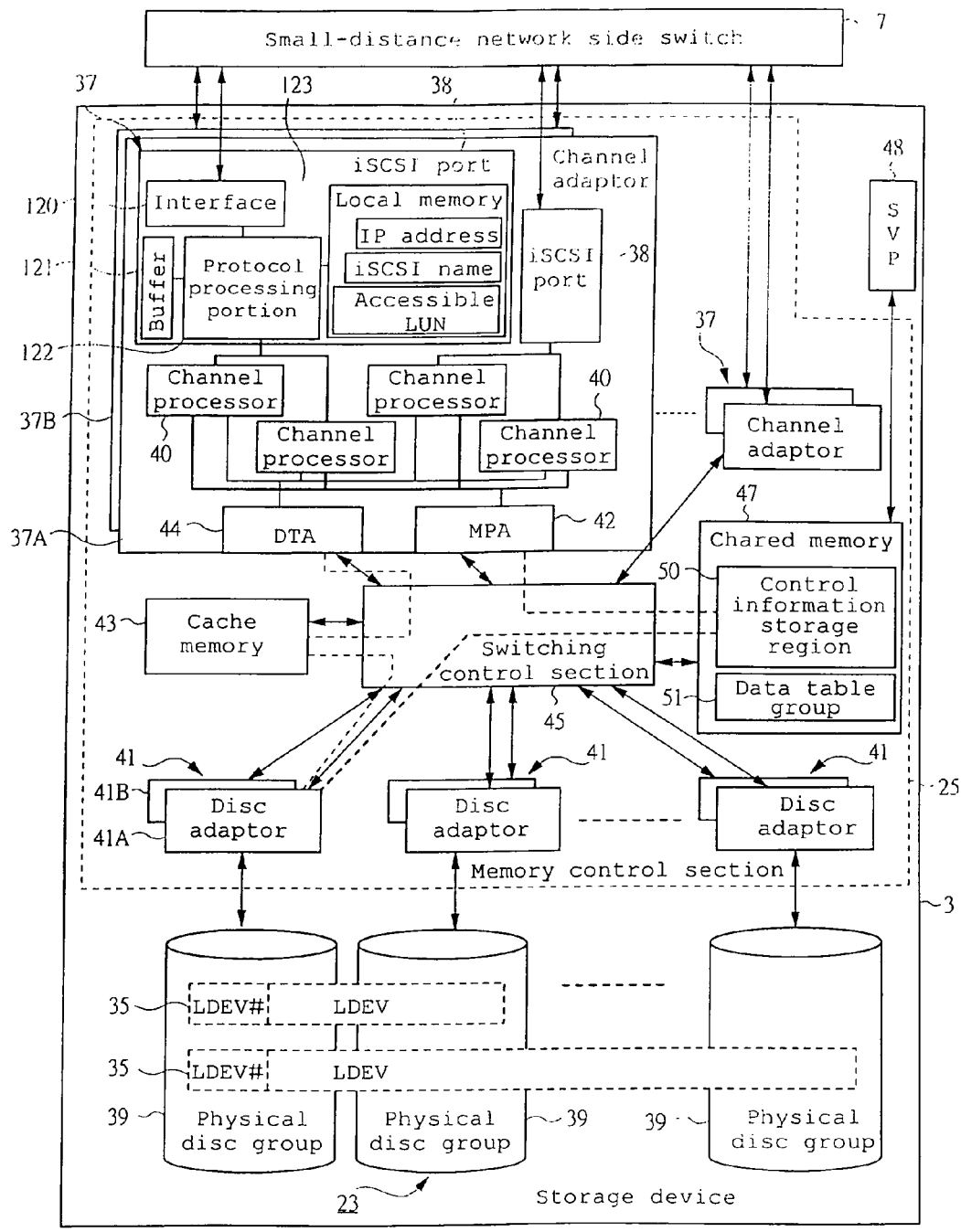
FIG. 2 is a block diagram showing a hardware structure of a storage device according to an embodiment of the present invention.

An example of a hardware configuration of the storage device according to an embodiment of the present invention will be described with reference to FIG. 2. FIG. 2 is a block diagram showing the hardware configuration of the storage device according to this embodiment.

The storage device 3 is, for example, a RAID (Redundant Array of Independent Inexpensive Disk) system and includes, as the memory device 23, one or more physical disc groups 39 each having a plurality of disc-shaped memory devices disposed in an array manner. One or more logical devices (hereinafter abbreviated as "LDEV") 35, which is a logical memory region, is set on a physical memory region provided by the physical disk group 39. The identification information of each LDEV (hereinafter abbreviated as "LDEV#") is allocated to the LDEV 35, and a logical unit number (hereinafter abbreviated as "LUN") which can be specified by the host device 5, 15 or 31 corresponds to each LDEV#.

Further, the storage device 3 further comprises one or more sets of channel adapters 37, a cache memory 43, a shared memory 47, one or more sets of disc adapters 41, and a switching control section 45.

Each set of channel adapter 37 includes a plurality of (typically two) channel adapters 37A and 37B, wherein the adapters 37A and 37B have substantially the same configuration. Consequently, if the host device 5, 15 or 31 cannot access the specified LDEV through one channel adapter 37A, it can access the same specified LDEV through the other channel adapter 37B (this is the same as the set of disc adapter 41). Because the channel adapters 37A and 37B each have substantially the same configuration, the channel adapter 37A will be described representatively.

The channel adapter 37A is provided with one or more (e.g., two) iSCSI ports 38 and 38, and is communicably connected to one or more host devices 5, 15 or 31 through the iSCSI port 38. The channel adapter 37A can be configured by a hardware circuit, a software circuit, or a combination of these, and establishes data communication between the storage device 3 and the host device 5, 15 or 31. The iSCSI port 38 includes an interface 120, a buffer 121, a local memory 123, and a protocol processing portion 122. The interface 120 has a cable port connected physically to the small-distance network side switch 7. The buffer 121 is a memory storing temporarily data transmitted and received between the host device 5, 15 or 31 and the storage device 3. The local memory 123 is, for example, a nonvolatile memory, which memorizes the IP address, the iSCSI name, and an accessible LUN which the iSCSI port can access. The protocol processing portion 122 is communicably connected to channel processors 40 and 40 through a specified internal bus (e.g., PCI bus), and performs a protocol processing following a TCP/IP, an iSCSI, and an SCSI protocol as described later. Note that the channel processor 40a may be provided with a function of performing the protocol processing following the TCP/IP, the iSCSI, and the SCSI protocol, instead of the protocol processing portion 122.

Also, on the channel adapter 37A, one or more microprocessors (hereinafter abbreviated as "channel processor") connected to each iSCSI port 38 are mounted communicably. Further, on the channel adapter 37A are mounted a microprocessor adapter (hereinafter abbreviated as "MPA") 42 connected communicably to the shared memory 47 and a data transmission adapter (hereinafter abbreviated as "DTA") connected communicably to the cache memory 43. When the channel processor 40 sends and receives control information (e.g., between processor message) between it and an external processor (more specifically, microprocessor (not shown) on the disc adapters 41A and 41B), the control information is sent and received through the MPA 42. When write data is written from the host device 5, 15 or 31 into the LDEV 35 and when read data having been read from the LDEV 35 is outputted from the storage device 3 to the host device 5, 15 or 31, the write data or read data passes through the DTA 44.

Each channel processor 40 acquires control information through the MPA 42 by polling a control information storage region 50 in the shared memory 47, reads out the read data stored in the cache memory 43 and transmits it to the host device 5, 15 or 31, or stores, into the cache memory 43, write-target data (i.e., write data) received from the host device 5, 15 or 31. The channel processor 40 further performs a processing such as authentication method determination or authentication execution as described later.

The cache memory 43 is a volatile or nonvolatile memory. The cache memory 43 stores temporarily the write data to be transferred from the channel adapters 37A and 37B to the disc adapters 41A and 41B, in the set of disc adapter 41, and the read data to be transferred from the disc adapters 41A and 41B to the channel adapters 37A and 37B.

The shared memory 47 is a nonvolatile memory, which includes, for example, a control information storage region 50 and a data table group 51. The above-described control information is stored in the control information storage region 50. An authentication control table etc. as described later is stored in the data table group 51.

Each set of disc adapters 41 is provided per physical disc group 39. The disc adapters 41A and 41B include one or more microprocessors (not shown), and read or write data with respect to the LDEV 35 having the LDEV# corresponding to the LUN specified by the host device 5, 15 or 31 through the processing of the microprocessor.

The switching control section 45 may be constructed as a high-speed bus such as a super high-speed crossbar switch for transmitting data by a high-speed switching operation. The switching control section 45 communicably connects the respective channel adapters 37A and 37B, the respective disc adapters 41A and 41B, the shared memory 47, and the cache memory 43 to one another. Exchanges of data or commands among the respective channel adapters 37A and 37B, the respective disc adapters 41A and 41B, the shared memory 47, and the cache memory 43 are carried out through the switching control section 45.

The foregoing is an outline of the storage device 3 according to this embodiment. This storage device 3 receives an I/O request from the host device 5, 15 or 31 and performs a processing based on the content of the I/O request.

<Input/Output (I/O) operation of Storage Device>

Hereinafter, an outline of processing flow of the I/O request in the storage device 3 will be described by taking an example in which the host device 5 issues an I/O request. This is substantially the same as the other host device 15 or 31. Note that there will be herein described by dividing the issued I/O requests into two cases of a read request and a write request.

(1) Case where I/O Request Indicates Read One

The I/O request issued from the host device 5 is stored in the buffer 121 of the iSCSI port 38. The channel processor 40 reads out the stored I/O request and determines whether or not data requested to be read by the I/O request (i.e., read data) exists in the cache memory 43.

If the determination result is affirmative, that is, the read data exists in the cache memory 43 (when cache hit occurs), the channel processor 40 acquires the read data from the cache memory 43 through the DTA 44 and transmits the read data to the host device 5 through the iSCSI port 38.

Meanwhile, if the above-described determination result is negative, that is, no read data exists in the cache memory 43 (when cache mistake occurs), then the channel processor 40 stores, in the shared memory 47 through the MPA 42, control information for instructing a microprocessor in the disc adapter 43A (hereinafter abbreviated as "disc processor") to read out, temporarily into the cache memory 43, the read data in the predetermined LDEV 35. When the disc processor reads out the control information, the read data is read out from the predetermined LDEV 35 and stored in the cache memory 43 by the disc processor. Thereafter, the channel processor 40 acquires the read data from the cache memory 43 and transmits it to the host device 5.

(2) Case where I/O Request Indicates Write One

An I/O request outputted from the host device 5 and including write data is stored in the buffer 121 of the iSCSI port 38. The channel processor 40 reads out the stored I/O request and determines whether or not data exists in a predetermined region on the cache memory 43 (hereinafter abbreviated as "cache slot").

If the determination result is affirmative, that is, the data exists in the predetermined cache slot (when cache hit occurs), the channel processor 40 overwrites the write data included in the above-mentioned read-out I/O request on the data in the predetermined cache slot.

Meanwhile, if the determination result is negative, that is, if no data exists in the predetermined cache slot (when cache mistake occurs), the channel processor 40 instructs a disc processor to read out, temporarily into the cache memory 43, the data from a LDEV specified by the above-described read I/O request. Consequently, if the data from the data memory region is read out and is stored in the predetermined cache slot by the disc adapter 41, the channel processor 40 overwrites the write data included in the read out I/O request on the data stored in the predetermined cache slot.

Thus, when the write data is written into the cache memory 43, a termination report is dispatched from the storage device 30 to the host device 5 by assuming that the write request is terminated. Note that when the write data is written into the cache memory, the write data is not generally reflected on the predetermined LDEV 35 and thereafter the write data from the cache memory 43 is read out by the disc processor and written into the predetermined LDEV.

The foregoing is a processing flow of read and write of the data in the storage device 3. The read and write processing of the data in the storage device 3 is performed when the I/O request is issued from the host device 5, 15 or 31. At this time, the feature of this embodiment is that access information from the host device 5, 15 or 31 is received by the iSCSI port and, by determining whether or not the authentication is required with respect to this iSCSI port, the accesses to the LDEV and LUN are controlled. This feature will be described in detail below.

<Authentication Method of iSCSI Port>

The storage device 3 according to this embodiment is so constructed that, in the above-described hardware configuration, a plurality of iSCSI ports in the memory control section 25 receive an access from the host device 5, 15 or 31 and the shared memory 47 memorizes the authentication information of each host device connected to the iSCSI ports in the unit of each port of the plurality of iSCSI ports. Particularly, the memory control section 25 has a function of: receiving access information from the host device through the iSCSI port; identifying the host device from the access information; determining whether or not the authentication to the iSCSI port from the host device is required by referring to the authentication information memorized in the shared memory 47; executing the authentication if the authentication is required from the determination results; and controlling whether or not the memory device 23 can be accessed based on the authentication results. Consequently, it is possible to determine whether or not each host device needs the authentication in the unit of each iSCSI port. Note that the "iSCSI port" mentioned here refers to a narrower function than the iSCSI port 38 in the above-described hardware configuration and, more specifically, means a cable port for an interface for connecting the memory control section 25 in the storage device 3 to the host device.

That is, for example, the channel processor 40 in the memory control section 25 refers to the authentication control table in the shared memory 47 which associates an iSCSI name for specifying a host device, with authentication information of the host device preliminarily registered (called authentication necessity, user ID (hereinafter abbreviated also as "user name")/password), in the unit of each iSCSI port, and determines the authentication necessity, and executes the authentication as occasion arises, and refers to a logical unit control table in the shared memory 47, which defines a LUN accessible by the host device based on the authentication results as occasion demands, and thereby makes control of whether or not the access to the LUN is possible. Consequently, the presence and absence of the authentications per host device can coexist in the same port and, at the same time, access security to the LUN can be realized.

<Authentication Control Table>

Figure 3:
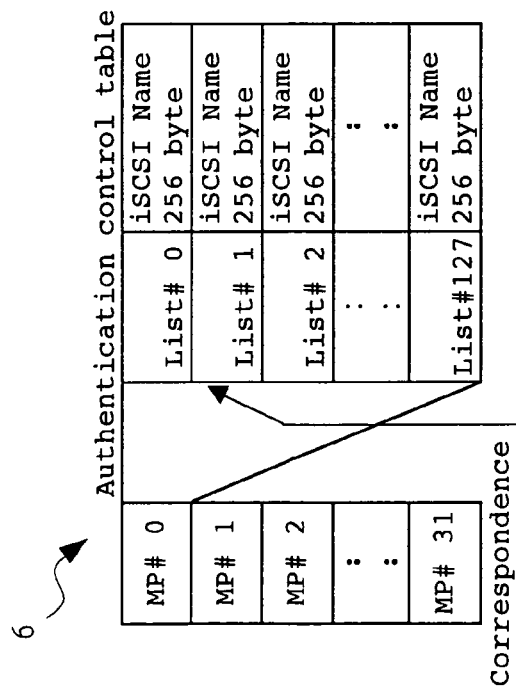
FIG. 3 is a diagram showing a configuration of an authentication control table in a storage device according to an embodiment of the present invention.

An example of the configuration of the authentication control table in the shared memory will be described with reference to FIG. 3. FIG. 3 is a diagram showing a configuration of the authentication control table. Note that, in FIG. 3, the table is divided to upper and lower portions in order to clear correspondence of the iSCSI name to the authentication information, but is actually a single table.

An authentication control table 61 is a table for controlling the authentication information of each host device in the unit of each port of the iSCSI ports. The authentication control table 61 is one of the data table group 51 stored in the shared memory 47 and, additionally, an internal resource control table, and a logical unit control table, etc., are also provided in the data table group 51.

The authentication control table 61 utilizes the iSCSI name as a key. As for the authentication type, it is possible to mount not only CHAP as detailed later but also another type. If the CHAP is installed, a user ID and password are necessary as authentication information, and further if another type is installed, the authentication information is information necessary for the type. Which authentication type is to be installed can be selected depending on a security level for the host device connected to each iSCSI port. For example, for an upper grade device whose high security is demanded, the CHAP authentication etc. is selected. For other upper grade device, ordinary authentication etc. is selected and registered.

That is, in the authentication control table 61, there are registered a port number of the iSCSI port (in the case of 32 ports in this embodiment, MP#0 to MP#31), an identification number of the host device allocated to each port number (in the case of 128 ports in this embodiment, list#0 to list#127), and the iSCSI name of the host device to be an authentication target when the network security is valid (iSCSI name: 256 bytes).

Further, in relation to each port number (MP#0 to MP#31), validity/invalidity setting information of the network security (Network Security ON/OFF), a user name for a target (User Name for Target) on a side of the storage device, and a password that is a secret value of the target (Secret for Target) are registered. Further, in relation to an identification number of the host device (list#0 to list#127) allocated to each port number, there are registered specification information of use or unuse of an authentication method (Auth ON/OFF), type information of the authentication selected by the authentication method (Used Security), a user name for an initiator (User Name for Initiator) on a side of the host device, and a password that is a secrete value of the initiator (Secret for Initiator).

Additionally, in the authentication control table 61, there are registered not only the information about the host device allocated to each port but also grouping information (Gr) for dividing the host device connected to each iSCSI port per iSCSI port.

Note that, in the authentication control table 61, besides the physical iSCSI port to which the host device is connected, a virtual logical port such as a piece of network switching equipment in the storage device 3 may be registered. In this case, the authentication information of each host device is registered in the unit of each logical port similarly to the iSCSI port.

<CHAP Authentication Function>

Figure 4:
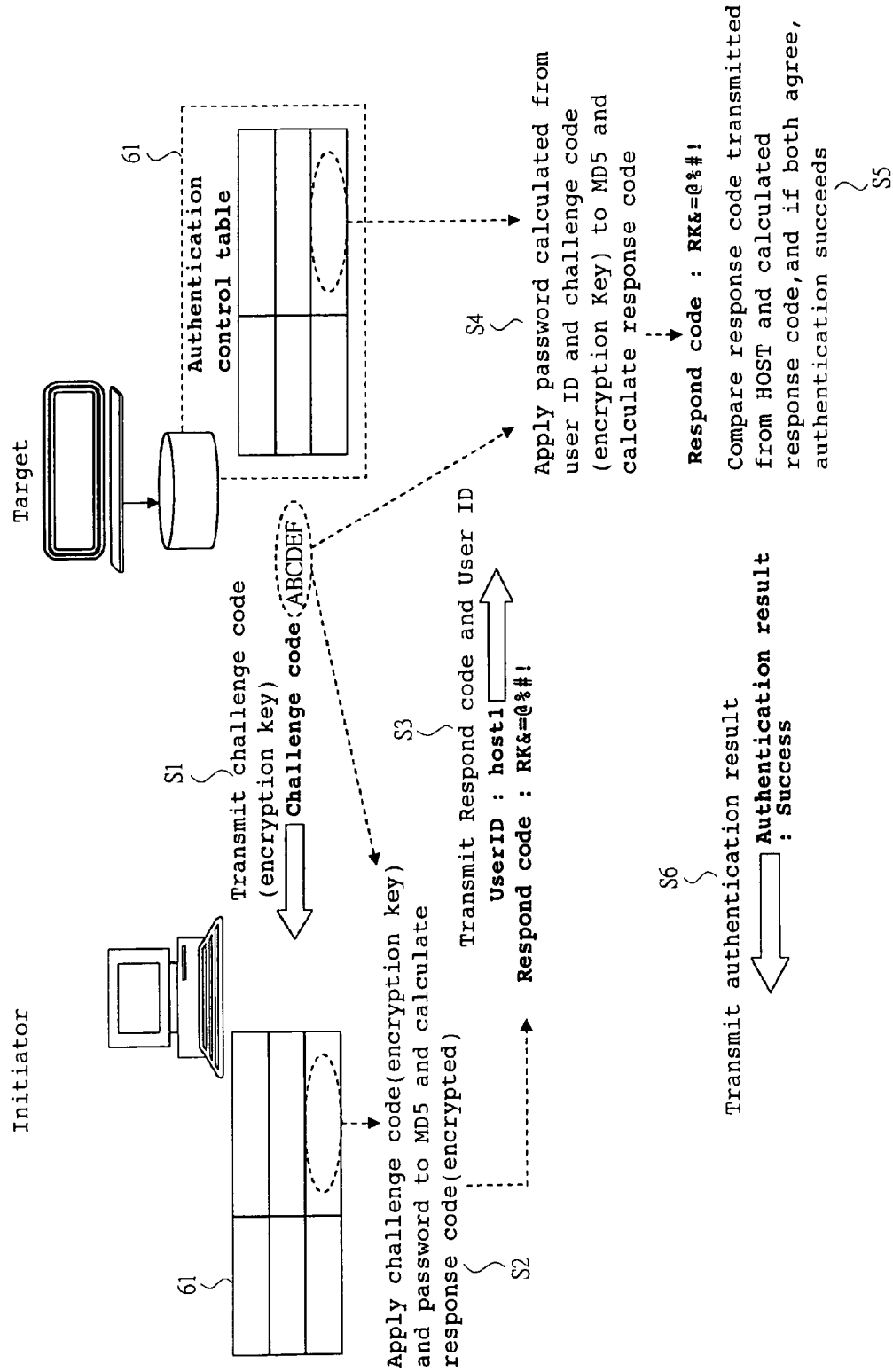
FIG. 4 is a diagram showing an outline of a CHAP authentication function in a storage device according to an embodiment of the present invention.
Figure 5:
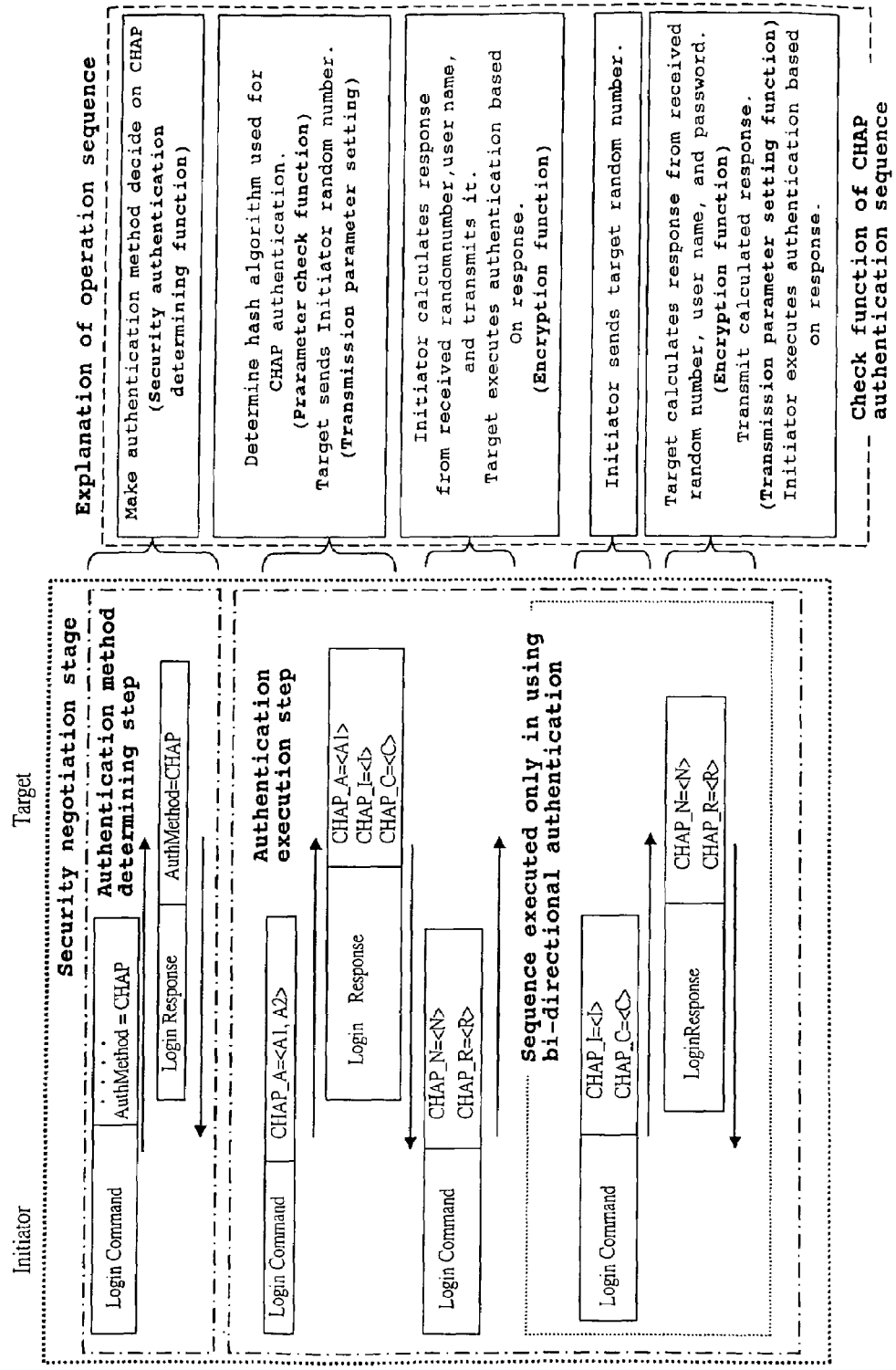
FIG. 5 is a diagram showing a sequence at the time of using the CHAP authentication function in a storage device according to an embodiment of the present invention.

An example of a CHAP authentication function will be described with reference to FIGS. 4 and 5. FIG. 4 is a diagram showing an outline, of the CHAP authentication function, and FIG. 5 is a diagram showing a sequence when the CHAP authentication function is used.

The CHAP authentication function is a function of realizing a Challenge Handshake Authentication Protocol (CHAP) on iSCSI login. This CHAP authentication is executed in an iSCSI login processing between the iSCSI initiator (host device) and a target (iSCSI port in the storage device 3) under the iSCSI protocol.

As for the outline of the CHAP authentication, as shown in FIG. 4, a target transmits a challenge code (encryption key) to an initiator in step S1. In this example, the challenge code is "ABCDEF". In step S2, the initiator applies the challenge code and the password to an encryption algorithm (in this example, MD5 as detailed later) to calculate an encrypted response code. Further, in step S3, this calculated response code and a user ID are transmitted to the target. In this example, the user ID is "host 1" and the response code is "RK&=@%#!".

Meanwhile, in step S4, the target applies the password calculated from the user ID and the challenge code to the encryption algorithm (MD5) to calculate a response code. In this example, the response code is "RK&=@%#!". In step S5, the response code transmitted from the initiator is compared to the calculated response code and if they agree with each other, the authentication succeeds and if they disagree, the authentication fails.

In step S6, the target transmits an authentication result to the initiator. In this example, since the response code transmitted from the initiator agrees with the calculated response code, the authentication succeeds. Therefore, the authentication result is "Success".

As shown in FIG. 5, the sequence at the time of using this CHAP authentication is executed between the initiator and the target by a check function of the CHAP authentication sequence on a security negotiation stage, and comprises an authentication method determining step and an authentication execution step.

(1) In the authentication method determining step, the initiator transmits the login command "Authentication Method=CHAP" to the target while the target transmits the login response "Authentication Method=CHAP" to the initiator, whereby the authentication method is made to decide on the CHAP. This is executed by a security authentication determining function.

(2) In the authentication execution step, the initiator transmits the login command "CHAP_A=<A1, A2>" to the target to determine a hash algorithm used for the CHAP authentication. This is executed by a parameter check function. In contrast, the target answers the login responses "CHAP_A=<A1>", "CHAP_I=<1>", and "CHAP_C=<C>" to the initiator and sends a random number. This is executed by a transmission parameter setting function.

(3) In the authentication execution step, the initiator transmits the login commands "CHAP_N=<N>" and "CHAP_R=<R>" to the target, and calculates a response from the received random number, user name, and password and sends it. In contrast, the target executes the authentication based on the response. This is executed by an encryption function.

(4) When a bi-directional authentication is used, the following sequence is further executed. That is, as a sequence executed only at the time of using the bi-directional authentication, the initiator transmits the login commands "CHAP_I=<1>" and "CHAP_C=<C>" to the target and sends a random number in the authentication execution step. This is executed by a transmission parameter setting function.

In contrast, the target answers the login responses "CHAP_N=<N>" and "CHAP_R=<R>" to the initiator, and calculates a response from the received random number, user name, and password. This is executed by the encryption function. Further, the target sends the calculated cipher to the initiator. This is executed by the transmission parameter setting function. Then, the initiator executes the authentication based on the response.

<Security Authentication Determination Condition>

An example of a security authentication determination condition by a security authentication determination function will be described with reference to FIG. 6. FIG. 6 is a diagram showing the security authentication determination condition.

The security authentication determination condition includes examples of item 1 to item 16, and the condition of each item is as follows. Typical examples will be described below. The security authentication determination by this security authentication determination function is carried out by referring to the RAID setting information in the storage device 3 registered in the above-mentioned authentication control table 61.

The item 1 indicates the case where, in the RAID setting of the storage device 3, the network security ON/OFF is "ON" and the presence/absence of registration of the corresponding host device is "presence" and the CHAP/None is "CHAP", wherein a HOST notification parameter with the host device is such that a startup stage is "Security" and the presence/absence of the authentication method is "presence" and the presence/absence (existence/nonexistence) of the CHAP is "presence (existence)". In this case, an execution action is execution of the CHAP authentication.

The item 2 indicates the case where, in the RAID setting, the network security ON/OFF is "ON" and the presence/absence of registration of the corresponding host device is "presence" and the CHAP/None is "CHAP", wherein the HOST notification parameter is such that the startup stage is "Security" and the presence/absence of authentication method is "absence" and the presence/absence (existence/nonexistence) of CHAP is "absence (nonexistence)". In this case, the execution action becomes a response of "Authentication Failure". The items 3, 4 and 5 also are a condition for the case where the execution action becomes the response of "Authentication Failure".

The item 6 indicates the case where, in the RAID setting, the Network Security ON/OFF is "ON" and the presence/absence of registration of the corresponding host device is "presence" and the CHAP/None is "None", wherein the HOST notification parameter is such that the startup stage is "Security" and the presence/absence of authentication method is "presence" and the presence/absence of CHAP is "absence". In this case, the execution action becomes execution of the ordinary authentication. The items 7 and 8 also are a condition for the case where the execution action becomes execution of an ordinary authentication.

The item 9 indicates the case where, in the RAID setting, the Network Security ON/OFF is "ON" and the presence/absence of registration of the corresponding host device is "absence" and the CHAP/None is undetermined ("–"), wherein the host notification parameter is such that the startup stage is "Security" and the presence/absence of authentication method is "presence" and the presence/absence of CHAP is "presence". In this case, the execution action becomes a response of "Authentication Failure". The items 10, 11, and 12 also are a condition for the case where the execution action becomes the response of "Authentication Failure".

The item 13 indicates the case where, in the RAID setting, the Network Security ON/OFF is "OFF" and the presence/absence of registration of the corresponding host device is undetermined ("–") and the CHAP/None is undetermined ("–") wherein the host notification parameter is such that the startup stage is "Security" and the presence/absence of authentication method is "presence" and the presence/absence of CHAP is "presence". In this case, the execution action becomes execution of the ordinary authentication. The items 14, 15, and 16 also are a condition for the case where the execution action becomes execution of the ordinary authentication.

Additionally, in the RAID setting (authentication control table 61) for the storage device 3, if the grouping information (Gr) for grouping the host devices connected to the iSCSI port is registered, this grouping information is referred to and the authentication necessity with respect to the iSCSI port from the host device is determined per group, so that the CHAP authentication to the host device or the ordinary authentication can be executed for each group.

<Encryption Function>

Figure 7:
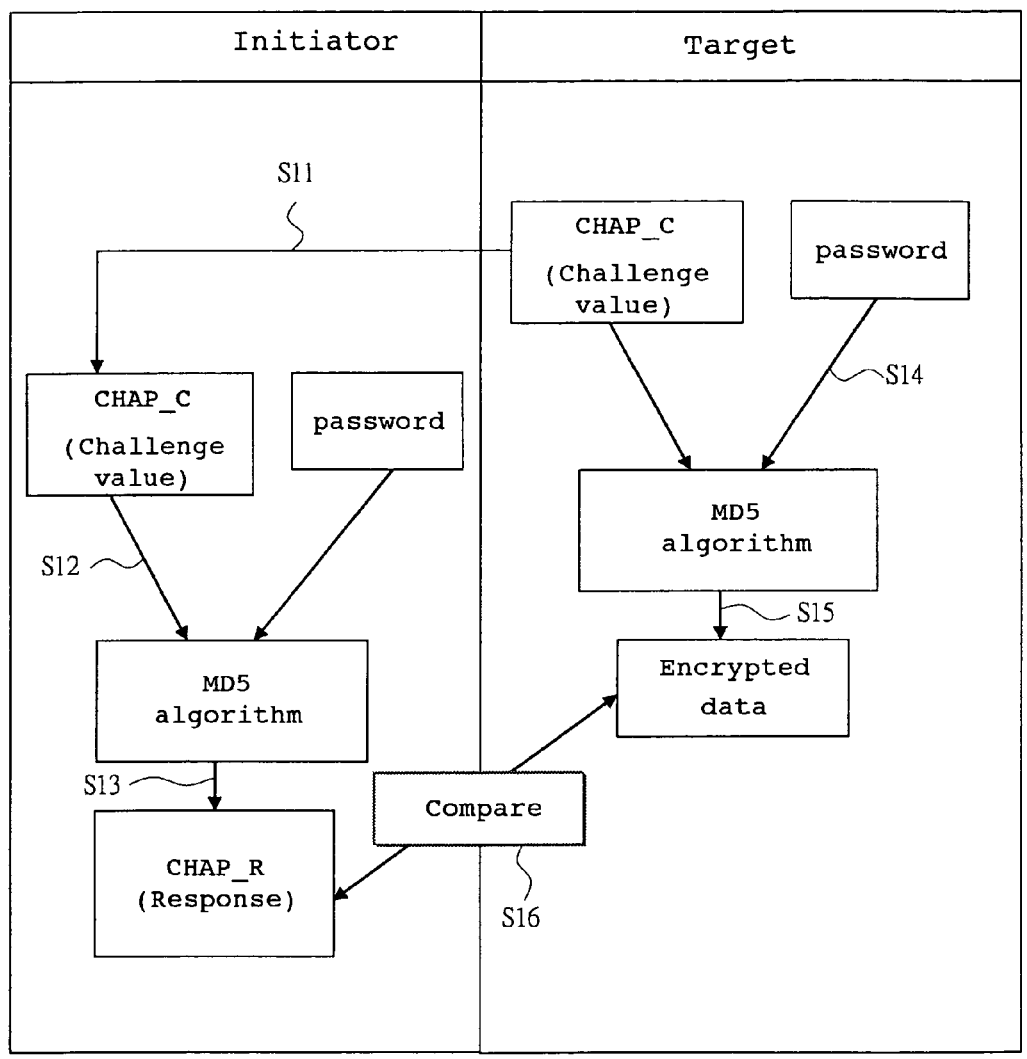
FIG. 7 is a diagram showing an authentication parameter calculating sequence in a storage device according to an embodiment of the present invention.

An example of an authentication-parameter calculation sequence by an encryption function will be described with reference to FIGS. 7 and 8. FIG. 7 is a diagram showing a authentication parameter calculating sequence, and FIG. 8 is a diagram showing a processing procedure for an MD5 algorithm.

The encryption function is a function of encrypting data using the MD5 algorithm. As for the authentication parameter calculation sequence by this encryption function, as shown in FIG. 7, the target transmits "CHAP_C" (Challenge value) to the initiator in step S11. Then, in steps S12 and S13, the initiator applies the "CHAP_C" (Challenge value) and the password to the MD5 algorithm to calculate "CHAP_R" (Response). Meanwhile, in steps S14 and S15, the target applies the "CHAP_C" (Challenge value) and the password to the MD5 algorithm to calculate encrypted data. Then, in step S16, the calculated "CHAP_R" (Response) and the encrypted data are compared. As a result of this comparison, if they agree with each other, the authentication succeeds and if they disagree, the authentication fails.

This MD5 algorithm is an algorithm that receives a message with an arbitrary length and outputs a 128-bit message digest. The calculation method comprises main five steps, as shown in FIG. 8.

In step S21, as the padding of a message, the data length is set to be 64-bits length smaller than multiple bit lengths of 512. In step S22, as the adding of a message-length bit to the message, the data bit length is expressed in 64 bits and is added to be multiple bit lengths of 512. In step S23, as the setting of an encrypted initial value, four initial values (A, B, C, and D) are set using little endian. In step S24, as encryption, every 16 words are encrypted to obtain four values (A, B, C, and D). In step S25, as an encryption result output, a message digest is obtained from the encrypted four values.

<Security Authentication Determination Processing>

Figure 9:
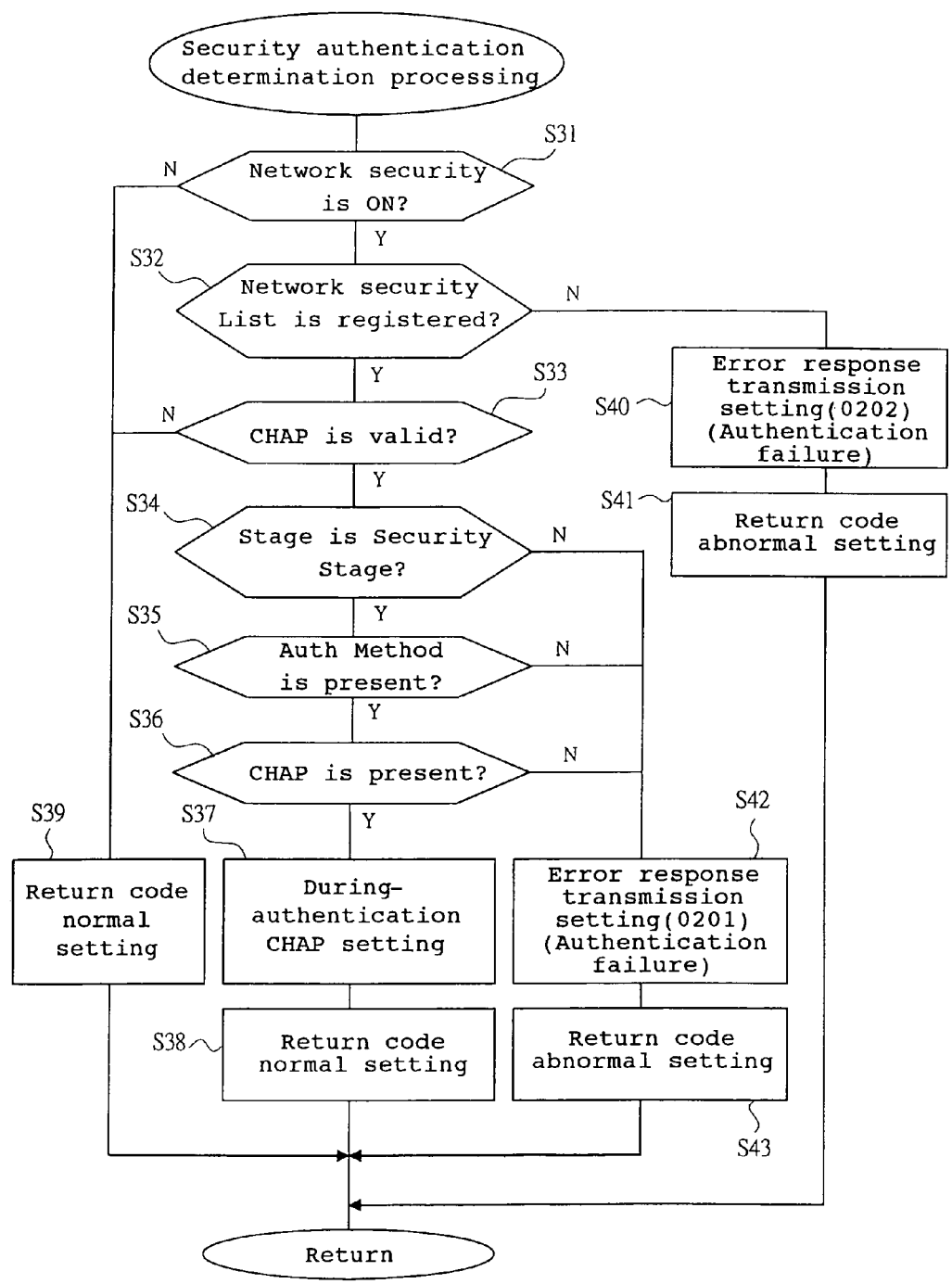
FIG. 9 is a diagram showing a procedure of a security authentication determining processing in a storage device according to an embodiment of the present invention.

An example of the security authentication determination processing by the security authentication determining function will be described with reference to FIG. 9. FIG. 9 is a diagram showing a procedure for the security authentication determination processing.

In the security authentication determination processing, whether or not the security authentication is to be executed is determined. This security authentication determination processing, as shown in FIG. 9, determines whether or not the Network Security is "ON" in step S31, and if it is "ON" ("Yes"), the procedure proceeds to next step S32. In this step S32, whether or not anything is registered in the Network Security List is determined, and if anything is registered ("Yes"), the procedure proceeds to next step S33.

In step S33, whether or not the CHAP is valid is determined, and if it is valid ("Yes"), the procedure proceeds to next step S34. In this step S34, whether or not the Stage is "Security Stage", and if it is "Security Stage" ("Yes"), the procedure proceeds to next step S35.

In step S35, whether or not the Auth Method is present is determined, and if the Auth Method is present ("Yes"), the procedure proceeds to next step S36. In this step S36, whether or not the CHAP is present is determined, and if the CHAP is present ("Yes"), the procedure proceeds to next step S37 to execute a during-authentication CHAP setting (session control table). Thereafter, in step S38, a return code normal setting is executed.

Further, if the Network Security is not "ON" ("No") in step S31 and if the CHAP is not valid ("No") in step S33, the procedure proceeds to step S39 to execute the return code normal setting.

If the registration of the Network Security List is absent ("No") in step S32, the procedure proceeds to step S40 to execute an error response transmission setting (0202: "Authentication Failure"). Thereafter, in step S41, a return code abnormal setting is executed.

If the Stage is not "Security Stage" ("No") in step S34 and the Auth Method is absent ("No") in step S35 and the CHAP is absent ("No") in step S36, then the procedure proceeds to step S42 to execute an error response transmission setting (0201: "Authentication Failure"). Thereafter, in step S43, the return code abnormal setting is executed.

<User Authentication Information Display/Setting Screen>

Figure 10:
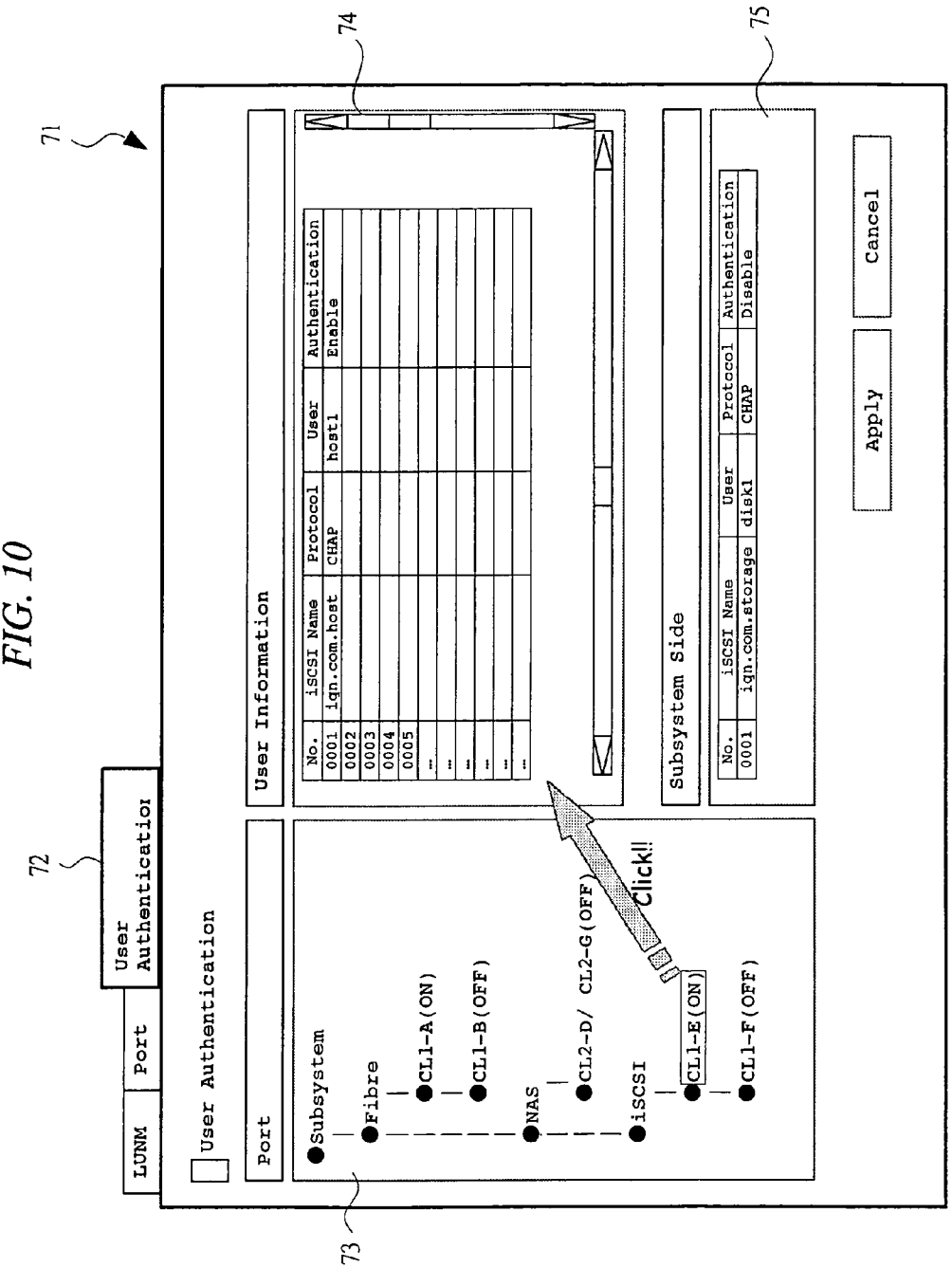
FIG. 10 is a diagram showing a display screen of user authentication information in a storage device according to an embodiment of the present invention.
Figure 12:
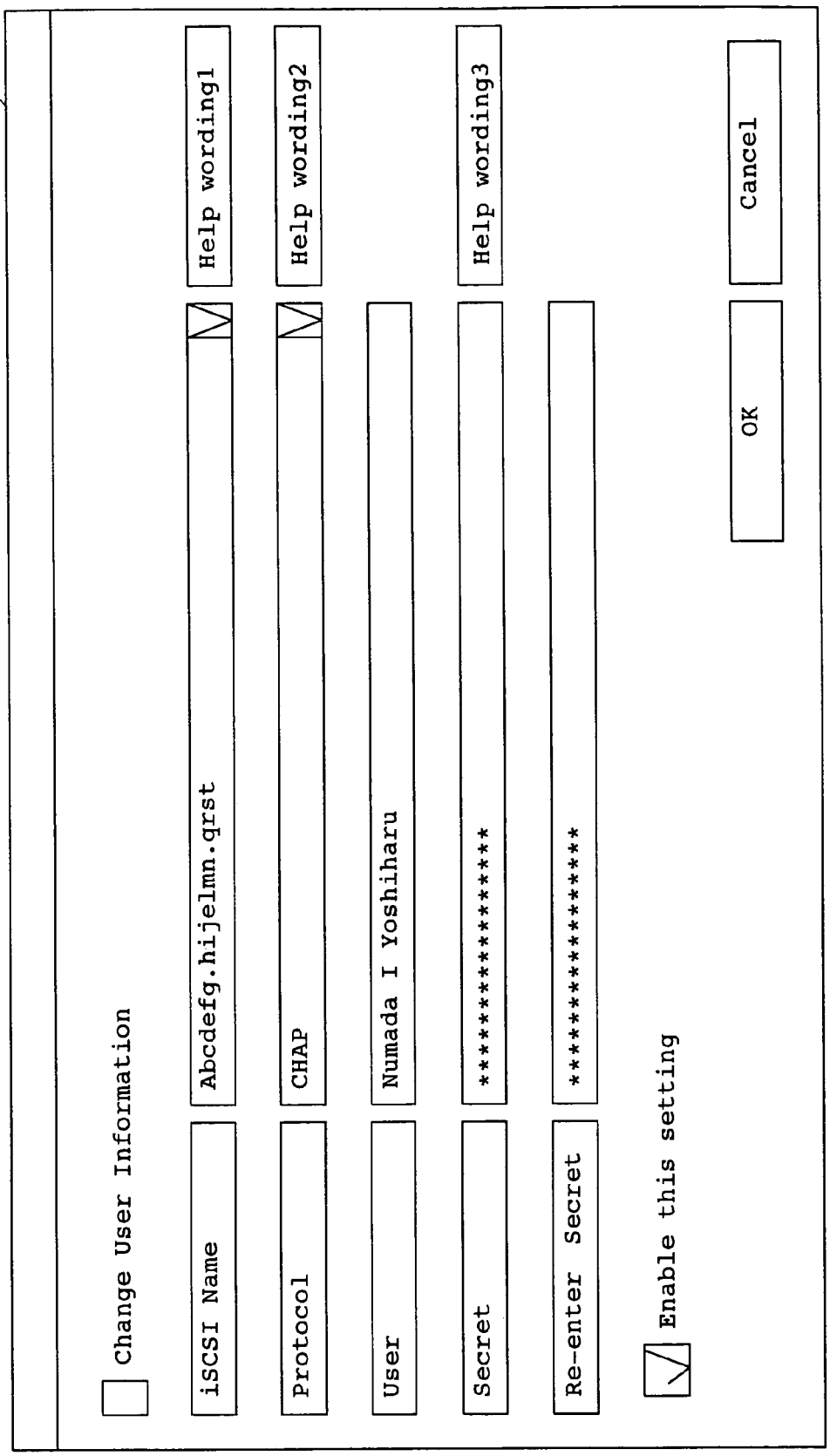
FIG. 12 is a diagram showing a change screen of user authentication information in a storage device according to an embodiment of the present invention.

An example of an user authentication information display/setting screen will be described with reference to FIGS. 10 to 12. FIG. 10 is a diagram showing a display screen of user authentication information, FIG. 11 is a diagram showing a registration screen of user authentication information, and FIG. 12 is a diagram showing a change screen of user authentication information.

In the CHAP authentication in the user authentication, user information including a user name corresponding to a host device ("initiator") and a password needs to be registered on a side of the storage device ("target"). This setting is carried out through the screen (GUI) of a control terminal such as a service processor (SVP) 48 connected to the shared memory 47 shown in FIG. 2 before an administrator or user logs in. Alternatively, this procedure may be carried out by an administrative client from an information terminal (Web console, RMI, or SNMP, etc.) through the administrative interface. Further, this user information is set also in the host device. As for the setting of this user information, a switch for network security (Network Security ON/OFF in FIG. 3) is provided in the unit of each port, and the setting can be executed when the network security is "ON".

For an example, in setting of a user name/password/iSCSI name, the user name/password/iSCSI name is set as a setting unit and can be set and referred to in the unit of each port. The number of settable units is up to 128 units for each port. The user name and password can be set in duplication if the iSCSI name is different therefrom. However, the duplicated setting of the iSCSI name within the same port is impossible. In encryption at the setting time, when the user information is set, it is encrypted on a client side and is transmitted and the encrypted information is decrypted on an administration terminal side and the decrypted information is set in the authentication control table 61 of the shared memory 47.

As for the relation between the network security switch and the CHAP authentication setting, in the case where the network security switch is "ON", if the authentication type is "CHAP", the CHAP authentication is executed. If it is "Disable", no CHAP authentication is executed. In this case, a connection from the host device whose user information is not registered is rejected. In the case where the network security switch is "OFF", if the authentication type is "CHAP" or "Disable", no security check is executed. In this case, a connection whose user information is not registered is permitted.

In a display screen 71 of the user authentication information, as shown in FIG. 10, a "User Authentication" screen 72 is provided in the storage control utility. In this screen 72, ports are represented in tree form in a port region 73. An example of this screen is such that "iSCSI"→"CL1-E" is "ON" and "CL1-F" is "OFF". Similarly to ports such as Fibre and NAS besides the iSCSI, the user authentication information can be display-set.

If any port is selected from the port tree, the user information registered in the above-mentioned port is displayed in a user information region 74 on the right side. In the example of this screen, if the "iSCSI"→"CL1-E (ON)" is clicked, not only an iSCS1 name, a protocol (authentication type), a user (User Name), and an authentication (Authentication Necessity) but also the user authentication information including other pieces of information (not shown) are displayed. Additionally, user authentication information such as an iSCSI name, a user name, and a protocol authentication is displayed in a subsystem region 75 of the storage device 3. Note that, as for representation of this user authentication information, the setting information of each port may be displayed not in the unit of each port but each specified host device.

New registration of the user authentication information is carried out according to a context menu by selecting a port icon. When an operation of the new registration is carried out, dialog layout (Add New User Information) as shown in FIG. 11 is displayed on a registration screen 81, whereby the new registration becomes possible. In an example of this screen, "iSCSI name", Protocol", "User", "Secret" (password), and "Re-enter Secret" (password) are all inputted, and the new registration becomes possible by clicking "OK". Note that the "Secrete" and "Re-entry secrete" are converted to an asterisk and displayed when being inputted.

Also, change of the user authentication information (including addition/deletion) is carried out on a change screen 82 of dialog layout as shown in FIG. 12. In an example of this screen, "iSCSI Name", "Protocol", "User", "Secret", and "Re-entry Secrete" are inputted into this screen, whereby the change becomes possible by clicking "OK".

<Information Display Screen of Host Device>

Figure 13:
FIG. 13 is a diagram showing an information display screen of a host device in a storage device according to an embodiment of the present invention.

An example of an information display screen of the host device will be described with reference to FIG. 13. FIG. 13 is a diagram showing the information display screen of the host device.

The information about the user authentication as shown in FIG. 13 can be represented on a screen of the host device. In this information display screen 91, there is displayed information such as the iSCSI port of the storage device 3 to which the host device can be connected, the iSCSI name allocated to this iSCSI port, an authentication condition of this iSCSI port, the user ID•password used for this authentication, and a number of a logical unit which can be accessed from this iSCSI port. The user ID•password mentioned here is a character string of ○○○○○ calculated as a response code when it is assumed that the "user ID•password"=○○○○○ and "challenge code"=ABCDEF and then ○○○○○ABCDEF is encrypted.

In this screen example of the host device, the host device can be connected to Port 1, Port 2, and Port 3 of the iSCSI port in the storage device. For example, as for the Port 1 of the iSCSI port, "1" is allocated as an iSCSI name and the CHAP authentication is set as an authentication condition, so that this host device can access the LUN0, 1, and 2 through the Port 1.

<Security Function to Logical Unit>

According to this embodiment, as described previously, each host device can determine whether or not the authentication is necessary in the unit of each iSCSI port, and control accessibility to the logical device (LDEV) and the logical unit (LUN) based on the result of authentication. The security technique for controlling accessibility to these LDEV and LUN has been disclosed in Japanese patent application No. 2003-396625 (filed on Nov. 27, 2003) and the corresponding U.S. patent application Ser. No. 10/768, 147 (filed on Feb. 2, 2004), and so this technique will be utilized here.

This technique describes that a data table group stored in a shared memory includes a logical unit control table and, in this logical unit control table, LUNs that can be specified from each host device and a LDEV# corresponding to each LUN are registered. Therefore, also in this embodiment, by referring to this logical unit control table, accessibility to the LUN can be controlled, whereby an access to the LUN is or not permitted to the host device.

Further, this technique describes a protocol configuration for communication relating to the iSCSI and a configuration of commands exchanged on the communication. The host device is provided with a physical layer, a data link layer, an IP protocol layer, a TCP protocol layer, an iSCSI protocol layer, an SCSI protocol layer, and an SCSI application layer, in this order from a lower layer to an upper layer. Meanwhile, the storage device is provided with a physical layer, a data link layer, an IP protocol layer, a TCP protocol layer, an iSCSI protocol layer, an SCSI protocol layer, and a device server layer, in this order from a lower layer to an upper layer.

Under this protocol configuration, each session between the data link layers and physical layers, between the IP protocols, between the TCP protocols, between the iSCSI protocols, between the SCSI protocols, and between the SCSI application layers and device server layers of both devices is carried out sequentially, whereby the storage device receives an I/O request outputted from the host device and executes a processing based on the I/O request.

For example, in the session between the iSCSI protocols, a connection of the iSCSI is established through a login phase in which a login request and a corresponding login response are exchanged. In a session between the SCSI protocols, the SCSI commands including the read request and the write request are transmitted from the host device to the storage device. In a session between the SCSI application layer and the device server layer, the write data is transmitted from the host device to the storage device, or the read data is transmitted from the storage device to the host device.

Figure 14:
FIG. 14 is a diagram showing a host name conversion table in a storage device according to an embodiment of the present invention.

Also in this embodiment, by utilizing this technique, the storage device controls an access from a host device of a login request source based on information received in the above-mentioned login phase. In this access, instead of the control number (S_ID) allocated in executing login at a standard of the above-mentioned fiber channel in Patent Document 1, an entry ID (HP table ID) allocated for each connection with the host device is used. For conversion between this HP table ID and the host iSCSI name, a host-name conversion table 65 as shown in FIG. 14 is used.

Thus, according to this embodiment, for the LUN security, a logical unit control table which is related to the iSCSI names and in which the host device defines accessible LUNs is provided in the shared memory 47 of the storage device 3 and, by referring to this logical unit control table based on the result of authentication, accessibility to the LUN can be controlled. Consequently, independently of the authentication function of each host device per iSCSI port, the security function to the LUN can be realized in the unit of each iSCSI port.

Effect of Embodiment

From the foregoing, according to the system including the storage device of the above-mentioned embodiment, the following effects can be obtained.

(1) By referring to the authentication control table 61, which is associated with the iSCSI name specifying the host device and the authentication information of the preliminarily registered host device, the necessity of the authentication can be determined to execute an authentication. Therefore, the necessity of the authentication for each host device can be determined in the unit of each iSCSI port.

(2) Because the necessity of the authentication for each host device can be determined in the unit of the iSCSI port, the presence/absence of the authentication of the host device connected under the same iSCSI port can coexist. On the type of the authentication, not only the CHAP authentication but also another type of authentication can be mounted depending on the security level of the host device connected to each iSCSI port.

(3) By referring to the internal resource control table associated with the number of the internal resource, which administrates control information of the connection with the host device based on the result of authentication and by referring to the logical unit control table that defines the logical unit accessible through the host device, accessibility to the logical unit can be controlled.

(4) In the logical unit security of the iSCSI port, since the internal resource control table that administrates the iSCSI name and the resource therein is associated with the logical unit control table, the authentication function can be realized independently of the security function of the logical unit access to the host device.

(5) By preparing the authentication control table 61, the authentication information of each host device can be registered in the unit of each port. The registration of this authentication information can be carried out by the user through the screen of the control terminal such as the SVP 48 of the storage device or the control interface.

(6) By specifying the presence/absence of the authentication in the unit of each port, the presence/absence of the authentication and the authentication information for each port can be set in unit of each host device.

(7) The authentication information can be displayed on the screen for each port, or setting information of each port can be displayed in the unit of not a port but a specific host device.

(8) Grouping of the host devices can be realized with security of the logical unit based on the iSCSI name, independently of the authentication and at the same time.

(9) Information of the host device can be set for the virtual logical port such as the network switch equipment without depending on the physical port such as an iSCSI port.

In the foregoing, the invention made by the present inventors has been concretely described based on the embodiment. However, needless to say, the present invention is not limited to the above-mentioned embodiment and can be variously modified and altered without departing from the gist thereof.

What is claimed is:

1. A storage device capable of being connected to a plurality of host devices, the device comprising:
   a memory device for memorizing write data received from said host devices and/or read data transmitted to said host devices; and
   a memory control section including a plurality of iSCSI ports each receiving accesses from a plurality of said host devices, and a shared memory for memorizing authentication information corresponding to an IP address allocated to each host device connected to said iSCSI ports per port unit of said plurality of iSCSI ports, an iSCSI name for specifying each host device, and a logical unit accessible by one of the host devices according to a logical unit control table, the memory control section controlling an access of each of said host devices to said memory device,
   wherein said memory control section is operatively connected to receive access information from said host devices through said iSCSI ports,
   wherein said shared memory has an authentication control table which associates target information with initiator information per port for each of said plurality of iSCSI ports, said target information includes an iSCSI port number of said iSCSI port, an iSCSI name of said iSCSI port, a password of said iSCSI port, and validity/invalidity setting information of network security, and said initiator information includes said iSCSI name for specifying said host device, type of authentication, use/unuse of the authentication, a user ID of an user of said host device, and a password of the user of said host device, and grouping information dividing the host devices connected to said iSCSI port,
   wherein said memory control section refers to said authentication control table to determine use/unuse of authentication with respect to said iSCSI port from said host device or from a user of said host device, and to determine use or unuse of an authentication per group with respect to said iSCSI ports from said host devices,
   wherein said memory control section is configured to identify said host devices using said access information; to determine necessity of an authentication with respect to said iSCSI ports from said host devices; to refer to the authentication information memorized in said shared memory to determine necessity of the authentication; to execute the authentication if the authentication is necessary based on a result of said determination; to control accessibility to said memory device based on the result of said authentication; and to permit an access with respect to said accessible logical unit from said host devices corresponding to said IP address and said iSCSI name,
   wherein said memory control section is configured to determine the necessity of the authentication by determining whether network security is ON and by determining whether a challenge handshake authentication protocol (CHAP) is present to authenticate an iSCSI login to said iSCSI ports by said host devices, wherein said shared memory stores said logical unit control table defining a logical unit accessible by said host device, and after said host device is authenticated with respect to said iSCSI port, said memory control section refers to said logical unit control table to permit said host device to access said logical unit.

2. The storage device according to claim 1, further comprising:

a control terminal for registering control information, wherein said control terminal registers the authentication information of each host device connected to said iSCSI ports in the unit of each port of the plurality of iSCSI ports in said memory control section.

3. The storage device according to claim 2, wherein said control terminal associates the iSCSI name for specifying said host device with authentication information including use or unuse of said host device and a user ID/password, in the unit of each port of said plurality of iSCSI ports, and registers the iSCSI name and the authentication information in the authentication control table of said shared memory.

4. The storage device according to claim 3, wherein said control terminal defines a logical unit accessible by said host devices and registers the logical unit in the logical unit control table of said shared memory.

5. The storage device according to claim 4, wherein said control terminal is capable of displaying information registered on said authentication control table and said logical unit control table.

6. The storage device according to claim 5, wherein said control terminal is capable of adding/changing/deleting information to said authentication control table and said logical unit control table.

7. The storage device according to claim 1, wherein if the CHAP is determined as present, said memory control section executes a during-authentication CHAP setting.

8. The storage device according to claim 7, wherein after executing the during-authentication CHAP setting, said memory control section executes a return code normal setting.

9. The storage device according to claim 1, wherein said memory control section is configured to determine whether the CHAP is valid, and if the Network Security is determined as not ON or if the CHAP is determined as not valid, said memory control section executes a return code normal setting.

10. The storage device according to claim 1, wherein said memory control section is configured to determine whether a Network Security List is registered, and if the Network Security List is determined as not registered, said memory control section executes an error response transmission setting to indicate "Authentication Failure".

11. The storage device according to claim 10, after executing the error response transmission setting, said memory control section executes a return code abnormal setting.

12. The storage device according to claim 1, wherein said memory control section is configured to determine whether a stage is a "Security Stage" and to determine whether an authentication method is present, and if the stage is determined as not the "Security Stage," if the Auth Method authentication method is determined as not present, and or if the CHAP is determined as not present, said memory control section executes an error response transmission setting to indicate "Authentication Failure."

13. The storage device according to claim 12, after executing the error response transmission setting, wherein said memory control section executes a return code abnormal setting.

14. The storage device according to claim 1, wherein said iSCSI ports include at least one virtual logical port.

15. The storage device according to claim 14, wherein said virtual logical port is a piece of network switch equipment which does not depend on a physical port.

16. The storage device according to claim 1, wherein said memory control section is configured to bi-directionally authenticate an iSCSI login to said iSCSI ports by said host devices, after determining the necessity of the authentication.

* * * * *